United States Patent
Chang et al.

(10) Patent No.: US 8,698,792 B2
(45) Date of Patent: Apr. 15, 2014

(54) LOW-POWER DISPLAY CONTROL METHOD AND ASSOCIATED DISPLAY CONTROLLER

(75) Inventors: Jen-Tang Chang, Hsinchu Hsien (TW); Yu-Chieh Hung, Hsinchu Hsien (TW); Hung-Yi Lin, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 222 days.

(21) Appl. No.: 12/938,888

(22) Filed: Nov. 3, 2010

(65) Prior Publication Data
US 2011/0102411 A1    May 5, 2011

(30) Foreign Application Priority Data
Nov. 3, 2009   (TW) ................................ 98137291 A

(51) Int. Cl.
*G06F 3/038*   (2013.01)

(52) U.S. Cl.
USPC ........................................................ 345/212

(58) Field of Classification Search
USPC ........................................................ 345/212
See application file for complete search history.

(56) References Cited

U.S. PATENT DOCUMENTS

| | | | | |
|---|---|---|---|---|
| 3,573,351 | A * | 4/1971 | Elwood | 348/506 |
| 2001/0006389 | A1 * | 7/2001 | Nanba et al. | 345/418 |
| 2005/0073867 | A1 * | 4/2005 | Byun | 363/84 |
| 2005/0086552 | A1 * | 4/2005 | Matsubara | 713/340 |
| 2005/0219273 | A1 * | 10/2005 | Yi | 345/690 |
| 2007/0162738 | A1 * | 7/2007 | Kim | 713/100 |
| 2008/0051914 | A1 * | 2/2008 | Hong et al. | 700/17 |

FOREIGN PATENT DOCUMENTS

| | | |
|---|---|---|
| CN | 1628336 A | 6/2005 |
| TW | I278824 | 4/2007 |

OTHER PUBLICATIONS

State Intellectual Property Office of the People'S Republic of China, "Office Action", Apr. 6, 2012, China.
Taiwan Intellectual Property Office, Office Action, Apr. 18, 2013, Taiwan.

* cited by examiner

*Primary Examiner* — Alexander Eisen
*Assistant Examiner* — Mark Regn
(74) *Attorney, Agent, or Firm* — WPAT, PC; Justin King

(57) ABSTRACT

A low-power display control method and associated display controller is provided. The low-power display control method detects a sensing signal to generate a sensing result. A control signal is generated according to the sensing result to control a power conversion controller to operate in a low-power power saving mode. In response to a wake-up event, the control signal is deasserted and an associated auxiliary circuit is also turned off, and then the display controller is woken up to restore to a normal operating mode.

18 Claims, 12 Drawing Sheets

US 8,698,792 B2

LOW-POWER DISPLAY CONTROL METHOD AND ASSOCIATED DISPLAY CONTROLLER

CROSS REFERENCE TO RELATED PATENT APPLICATION

This patent application is based on Taiwan, R.O.C. patent application No. 098137291 filed on Nov. 3, 2009.

FIELD OF THE INVENTION

The present invention relates to a display control method and associated display controller, and more particularly, to a low-power display control method and associated display controller.

BACKGROUND OF THE INVENTION

FIG. 1 shows a block diagram of a display circuit in a conventional display monitor. A display circuit 100 comprises a power circuit 110, a scaler 120 and a backlight module 130. The power circuit 110 converts an AC power 112 into voltage signals 114 and 116, which are provided to the backlight module 130 and the scaler 120, respectively. The display circuit 100 may be applied to computer monitors, analog televisions or digital televisions. Inspired by the global trend of carbon reduction, manufacturers of the technology industry are dedicated to reducing power consumption under the standby mode by AC/DC conversion using the power circuit 110 of the prior art.

Therefore, there is a need for a low-power display controller and associated method that can be realized with low cost.

SUMMARY OF THE INVENTION

The present invention provides a display controller comprising a voltage detecting circuit, a low-power control circuit, a power management unit, a selector, a microcontroller, and a crystal input/output (I/O) circuit. The voltage detecting circuit detects a voltage level of a sensing signal. The low-power control circuit, coupled to the voltage detecting circuit, generates a first control signal according to the voltage level. The voltage detecting circuit can be an analog-to-digital converter (ADC) or a comparator. The power management unit receives a wake-up event and generates a second control signal in response to the wake-up event. The selector, coupled to the low-power control circuit and the power management unit, selectively outputs either the first control signal or the second control signal to control a power conversion controller to operate in a low-power power saving mode or a normal operating mode. The selector can be a multiplexer. When the selector outputs the second control signal, the power management unit deactivates the low-power control circuit, the microcontroller, the crystal I/O circuit and a DVI/HDMI clock amplifier to reduce power consumption.

The invention further provides a low-power display control method applied to a display controller. The lower-power display control method comprises: detecting a sensing signal to generate a sensing result, e.g., converting the sensing signal with an ADC to generate a sensing result, or comparing the sensing signal with a predetermined voltage level to generate a sensing result; generating a control signal according to the sensing result, e.g., generating the control signal with a general purpose input/output (GPIO) pin to control a power conversion controller to operate in a low-power power saving mode; deasserting the control signal and deactivating an associated auxiliary circuit in the display controller in response to a wake-up event, e.g., deactivating a microcontroller, a crystal I/O circuit and a DVI/HDMI clock amplifier; and waking up the display controller to restore to a normal operating mode.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
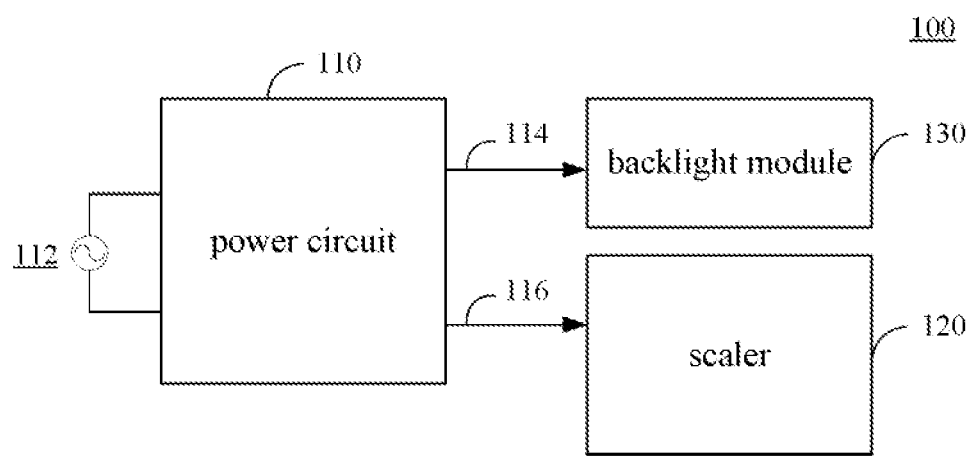
FIG. 1 is a block diagram of a display circuit in a conventional display monitor.
Figure 2:
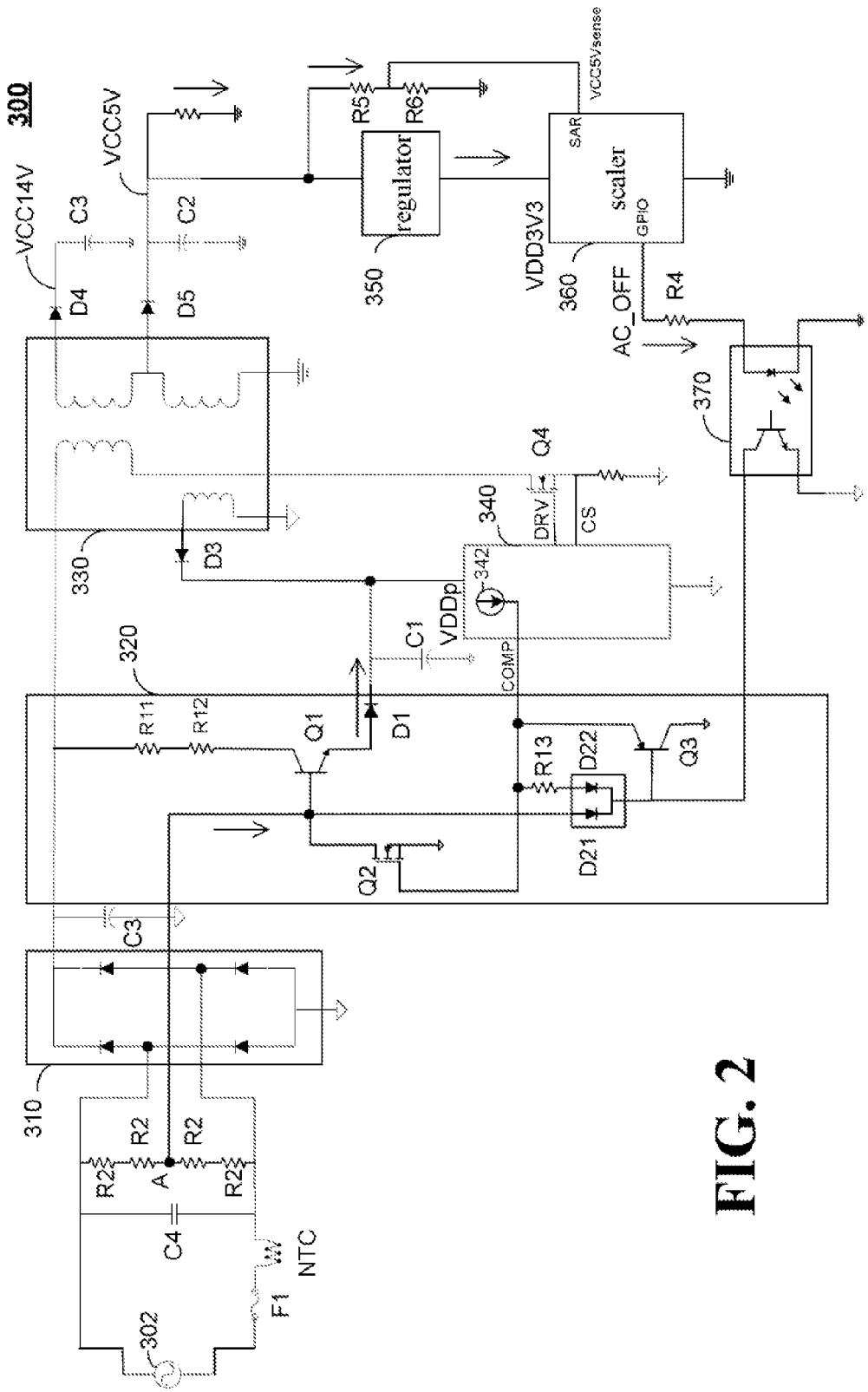
FIG. 2 is a schematic diagram of an ultra-low-power display control circuit according to one embodiment of the invention.
Figure 4:
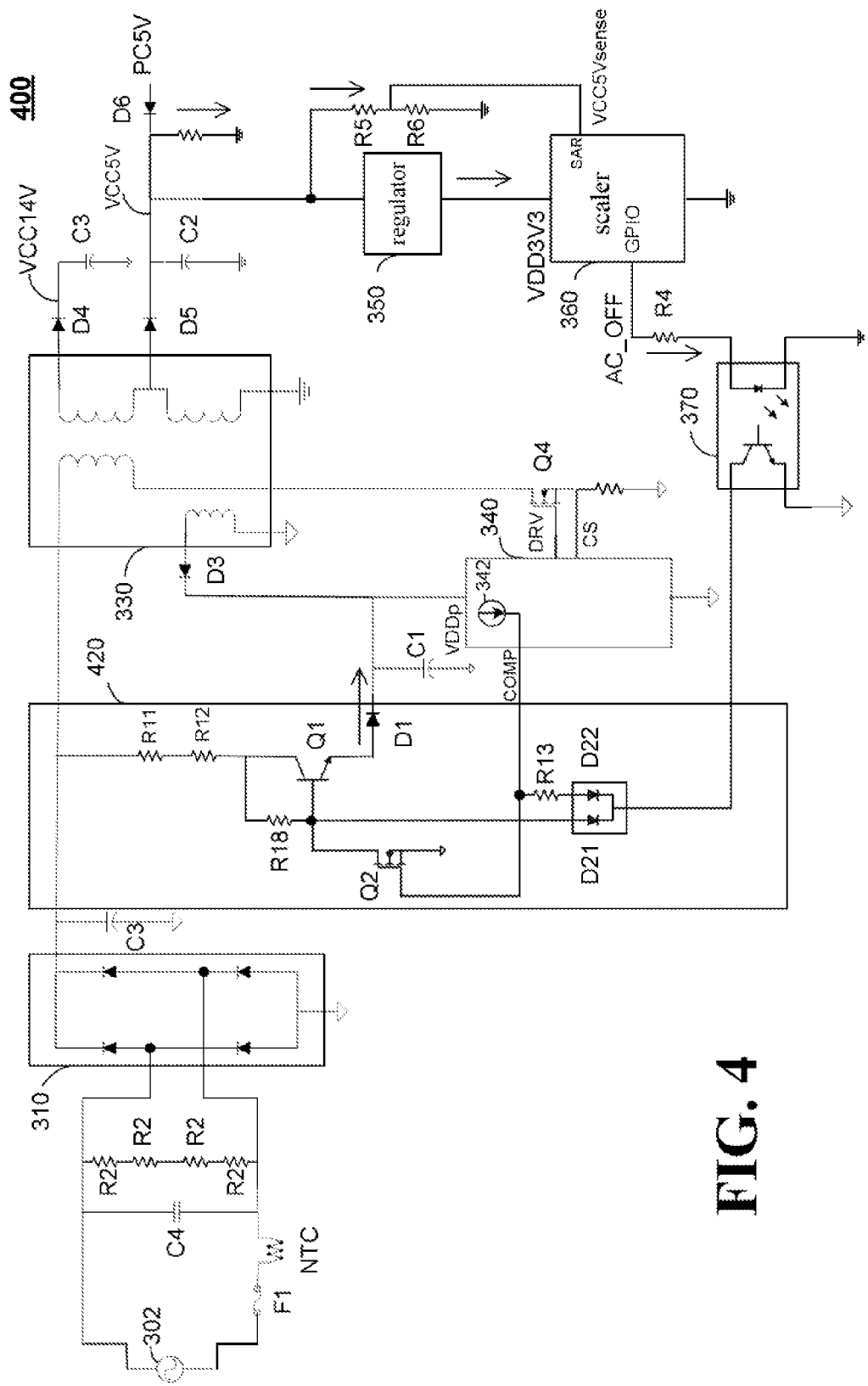
FIG. 4 is a schematic diagram of an ultra-low-power display control circuit according to another embodiment of the invention.

FIG. 2 shows an ultra-low-power display control circuit 300 according to one embodiment of the invention. An AC power 302 provides a high AC voltage, e.g., an AC voltage ranging from 80V to 220V, to a rectifier 310. The AC voltage is rectified by the rectifier 310 to output a high DC voltage, e.g., a DC voltage ranging from 120V to 375V, to a bias circuit 320 and a transformer 330. For example, the rectifier 310 can be a full-bridge or half-bridge rectifier. The structure 340 in FIGS. 2 and 4 is a power conversion controller. The DC voltage is biased by the bias circuit 340 into a DC voltage signal VDDP to power the power conversion controller 340. The power conversion controller 340 is exemplified as an analog circuit chip in an 8-pin package. By controlling the transistor Q4 at the transformer 330's primary side, the transformer 330 converts a high AC voltage, originated from the high DC voltage, to a low AC voltage at its secondary side through coil inductance. Further, the diodes D4 and D5 couple to the capacitors C3 and C2 respectively to convert the low AC voltage into predetermined DC voltages VCC14V or VCC5V to operate other circuits. For example, DC voltage signals VCC14V and VCC5V are outputted to provide 14V and 5V DC voltages, respectively. The 14V DC voltage powers a backlight module, e.g., a cold cathode fluorescent tube. The DC voltage signal VCC5V passes through a regulator 350, e.g., a low drop-out (LDO) regulator, to output a DC voltage VDD3V3 to power a scaler 360. The scaler 360 controls operations of the power conversion controller 340 according to the DC voltage signal VDD5V outputted from the secondary side of the transformer 330. For example, the DC voltage signal VCC5V is forwarded into resistors R5 and R6 to generate a sensing signal VCC5Vsense further sent to a successive approximation (SAR) ADC, for example, in the scaler 360 to detect the voltage of the DC voltage signal VCC5V. Alternatively, the sensing signal VCC5Vsense is sent into a comparator (not shown) in the scaler 360 to be compared with a reference voltage, such as a 4V voltage, so as to detect the voltage status of the DC voltage signal VCC5V. The scaler 360 then utilizes a general purpose input/output (GPIO) pin thereof, via an opto-coupler (also referred to as a photocoupler), to control a compensation pin COMP of the power conversion controller 340, thus feedback-controlling operating modes of the power conversion controller 340. The bias circuit 320 comprises resistors R11, R12, R13, diodes D21 and D22, and transistors Q1, Q2 and Q3. Through a route of the resistors R11 and R12, and the transistor Q1, the bias circuit 320 biases the high DC voltage into a DC voltage signal VDDP for powering the power conversion controller 340.

The power conversion controller 340 is capable of momentarily maintaining its operations by utilizing charge stored in a capacitor C1 when powered off by turning off the transistor Q1. Persons having ordinary skill in the art can appreciate that the capacitor C1 concerns the time needed for providing a DC voltage for normal operation when the power is switched on. Therefore, the capacitor C1 shall not be too large, and may be, for example, 22 µF. Similarly, the scaler 360 is capable of momentarily maintaining its operations by utilizing a capacitor C2 when power is cut off. The capacitor C2 is rather large as, for example, 2000 µF.

With reference to FIG. 2, when a system power is turned off, the ultra-low-power display controller circuit 300, through the capacitor C2, momentarily maintains operations of the scaler 360. The regulator 350 outputs a regulated DC voltage signal 3V3 to power the scaler 360, and operations of which are maintained as long as the regulated DC voltage signal 3V3 outputted from the regulator 350 is higher than the operating voltage of the scaler 360. The power consumption of the regulator 350 is quite small. Supposing the operating voltage of the scaler 360 is 3.3V, the scaler 360 may operate in a sleep mode provided that the DC voltage signal VCC5V exceeds (3.3V+LDO drop) via gradual discharge of the capacitor C2.

After cutting off the system power, via a resistor R4 and the opto-coupler 370, the scaler 360 sends out a signal AC_OFF to the power conversion controller 340 to draw current, e.g. via the COMP pin, the power conversion controller 340 then prompts the current source 342 to provide the current via the resistor R13, the diodes D21 and D22, and the transistor Q3. For example, when the current transfer ratio (CTR) of the opto-coupler 370 is 1:1, the ratio of the currents drawn at two sides of the opto-coupler 370 is 1:1, and assertion of the signal AC_OFF is associated with the voltage level of the DC voltage signal VCC5V. When the power conversion controller 340, via the COMP pin, learns that the voltage of the scaler 360 is lower than a predetermined level, the power conversion controller 340 momentarily drives a signal DRV to turn on the transistor Q4. Thus, the primary side of the transformer 330 is activated to draw current from an external power supply to charge the capacitor C1 as well as to charge the large capacitor C2 at the secondary side of the transformer 330 to power the scaler 360 during a next cycle. Arrows in FIG. 2 indicate main current flow directions for a better understanding of operations of the embodiment.

When the signal AC_OFF is asserted, such as at a high level, the opto-coupler 370 generates a coupling current by drawing the coupling current from a node A, the diodes D21 and D22 to the opto-coupler 370, such that the voltage at the base of the transistor Q3 drops to conduct the transistor Q3 and the diodes D21 and D22, the voltage at the compensation pin COMP drops to turn off the transistor Q2, and the potential at the base of the transistor Q1 drops to turn off the transistor Q1. The transistor Q3 amplifies the discharge current for accelerating discharge speed of the current source 342. In the event that the current of the current source 342 in the power conversion controller 340 is low, the transistor Q3 may be removed but to directly discharge through the diode D22 alone. In contrast, when the signal AC_OFF is deasserted, such as at a low level, no induced current is generated. At this point, the transistor Q1 is turned on to charge the capacitor C1, the voltage at the compensation pin COMP gradually rises to turn on the transistor Q2, such that the base of the transistor Q2 is then grounded to turn off the transistor Q1, and the power conversion controller 340 consumes power stored in the capacitor C1. Thus, the capacitor C1 is controlled to cyclically charge and discharge by controlling whether to activate or deactivate the power conversion controller 340 through the signal AC_OFF.

Figure 3:
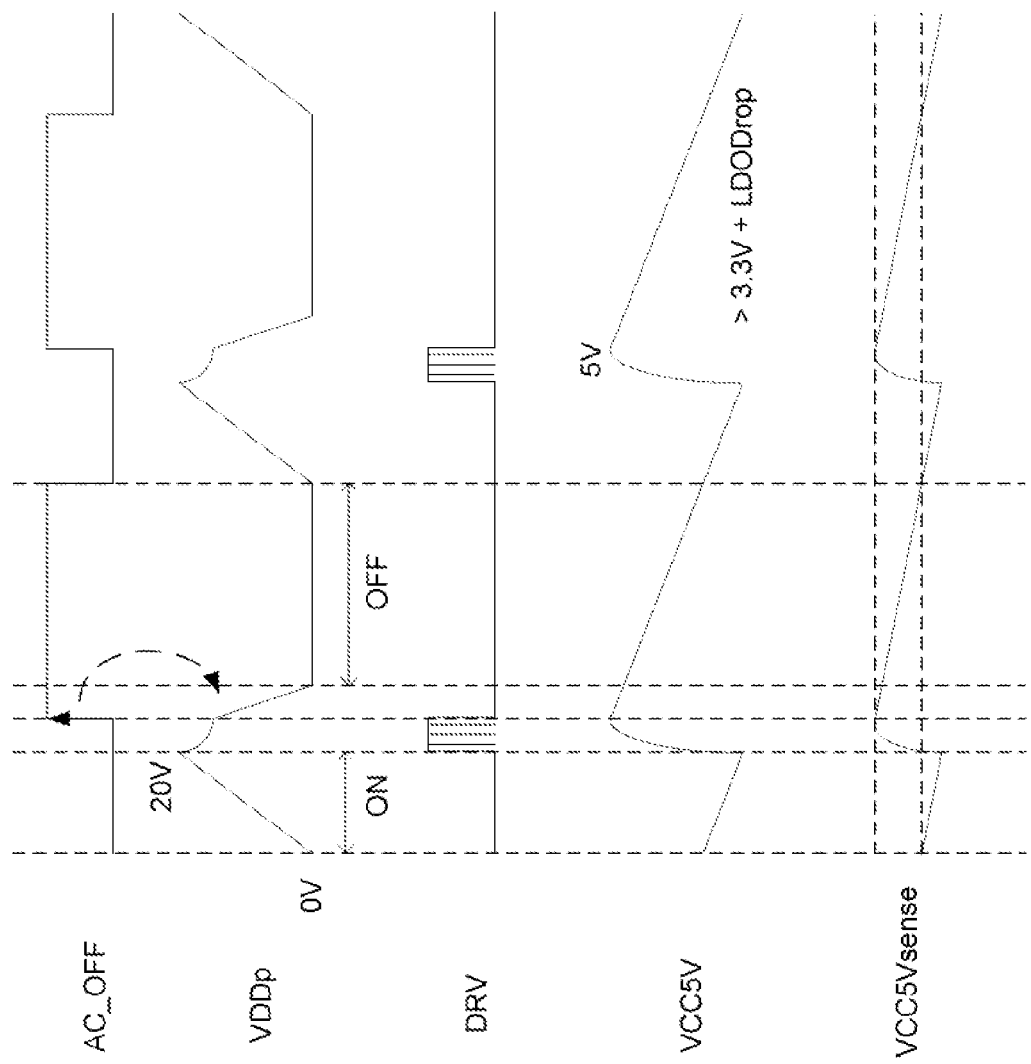
FIG. 3 shows main waveforms in FIG. 2.

FIG. 3 shows a waveform diagram of the ultra-low-power display control circuit 300, illustrating relationships between the signal AC_OFF, the signals VDDP, DRV, VCC5V, and VCC5Vsense. Also refer to the ultra-low-power display control circuit 300 in FIG. 2 for the description below. In this embodiment, when the signal AC_OFF is asserted, e.g. by being at high level, the potential is pulled down rapidly by drawing current from the current source 342 in the power conversion controller 340 to turn off the transistor Q1, thus forcibly cutting off the external power supply to the power conversion controller 340. The voltage signal VDDP is rapidly pulled low for a long period of time for power saving. When the signal AC_OFF is deasserted, e.g. by being at low level, the transistor Q1 is turned on to charge the capacitor C1, such that the voltage signal VDDP rapidly rises to reach a predetermined maximum voltage, e.g., 20V. The power conversion controller 340 momentarily asserts the signal DRV, e.g., high-level or low-level DRV signal is momentarily generated by a pulse width modulation (PWM) controller in the power conversion controller 340, or the DRV signal in different frequencies is generated by a pulse frequency modulation (PFM) controller, to momentarily switch on the transistor Q4, such that the primary side of the transformer 330 is momentarily activated to charge the capacitor C1 and to charge the large capacitor C2 at the secondary side of the transformer 330. For example, the voltage signal VCC5V is rapidly pulled up to 5V or charged the large capacitor C2 at the secondary side for a predetermined period of time. Provided that the voltage signal VCC5V discharges before reaching the predetermined voltage, e.g. (3.3V+LDO drop), the scaler 360 is capable of monitoring changes in the sensing signal VCC5Vsense to keep operating cyclically. The sensing signal VCC5Vsense indicates charging and discharging status of the voltage signal VCC5V. It should be noted that, the voltage signal VDDP remains low for a quite long period of time so that the signal DRV is asserted with a long interval in between for ultra-low power consumption. Persons skilled in the art can make proper modification according to the above disclosure. For example, the operation timing of signal DRV can be properly modified.

FIG. 4 shows an ultra-low-power display control circuit 400 according to another embodiment of the invention. Compared to the embodiment in FIG. 2, the main difference lies in that, in the ultra-low-power display control circuit 400, a bias circuit 420 provides the bias function using a resistor R18, the transistor Q3 is omitted, and a rightmost 5V signal PC5V coming from a personal computer is coupled to the voltage signal VCC5V via a diode D6 to charge the capacitor C2. The scaler 360 can be integrated in display controllers as applied to the analog television and digital television, as encompassed by the scope of the invention.

Figure 5:
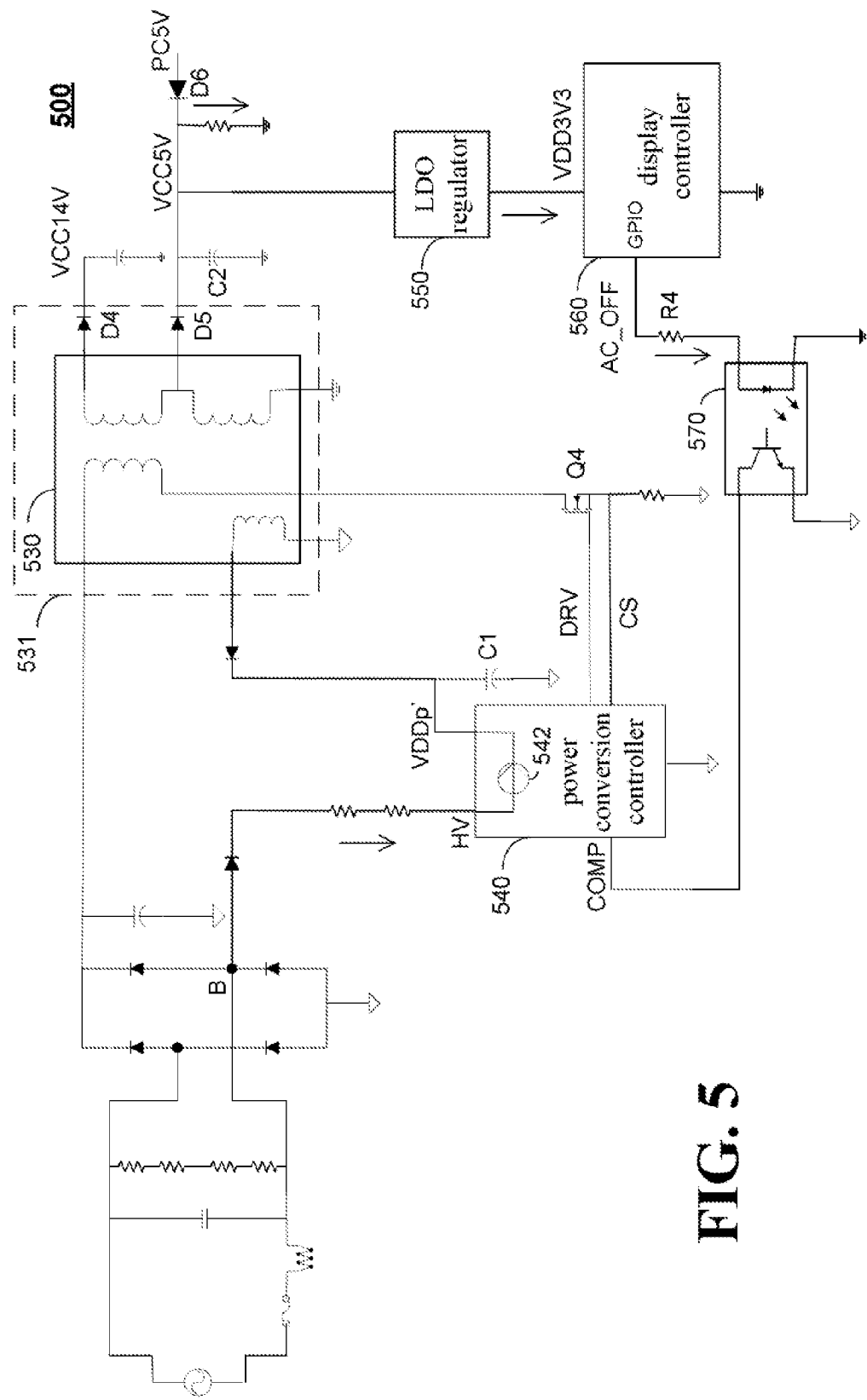
FIG. 5 is a schematic diagram of an ultra-low-power display control circuit according to yet another embodiment of the invention.

FIG. 5 shows an ultra-low-power display control circuit 500 according to yet another embodiment of the invention. Similar signals are indicated as the preceding symbols to better understand operations of this embodiment. Compared to the embodiment in FIG. 2, in the ultra-low-power display control circuit 500, a power conversion controller 540 is integrated with a similar element to the bias circuit 320 in FIG. 2. The display controller 560 directly detects the voltage signal VDD3V3 to further save a pin previously dedicated to the SAR ADC or the comparator. Alternatively, the display controller 560 may detect changes in the voltage signal VCC5V. As disclosed in the foregoing embodiment, changes in the voltage signal VDD3V3 are detected by a display controller 560 to ensure that the voltage signal VDD3V3 is higher than 3.3V, for example. When the voltage signal VDD3V3 is above 3.3V, the display controller 560, by asserting the signal AC_OFF through the GPIO pin, prompts a power conversion controller 540 to stop drawing an external power supply via an opto-coupler 570 and a compensation pin COMP. When the voltage signal VDD3V3 drops close to 3.3V, the display controller 560 deasserts the signal AC_OFF. At this point, by switching on an internal switch (not shown), the power conversion controller 540 momentarily draws the external power supply via a high voltage power supply pin HV from a node B, such that a controlled current source 542 in the power conversion controller 540 charges the capacitor C1 via a voltage signal VDDP' to momentarily assert the drive signal DRV to activate the primary side of a voltage transforming device 531, including a transformer 530 and diodes D4 and D5, whereby the voltage transforming device 531, through the diode D5, charges the capacitor C1 and charges the large capacitor C2 at the secondary side of the transformer 530 to a predetermined voltage or for a predetermined time period. Thus, the power conversion controller 540 is capable of cutting off the external power supply over a long period of time so that power consumption is significantly reduced.

Figure 6:
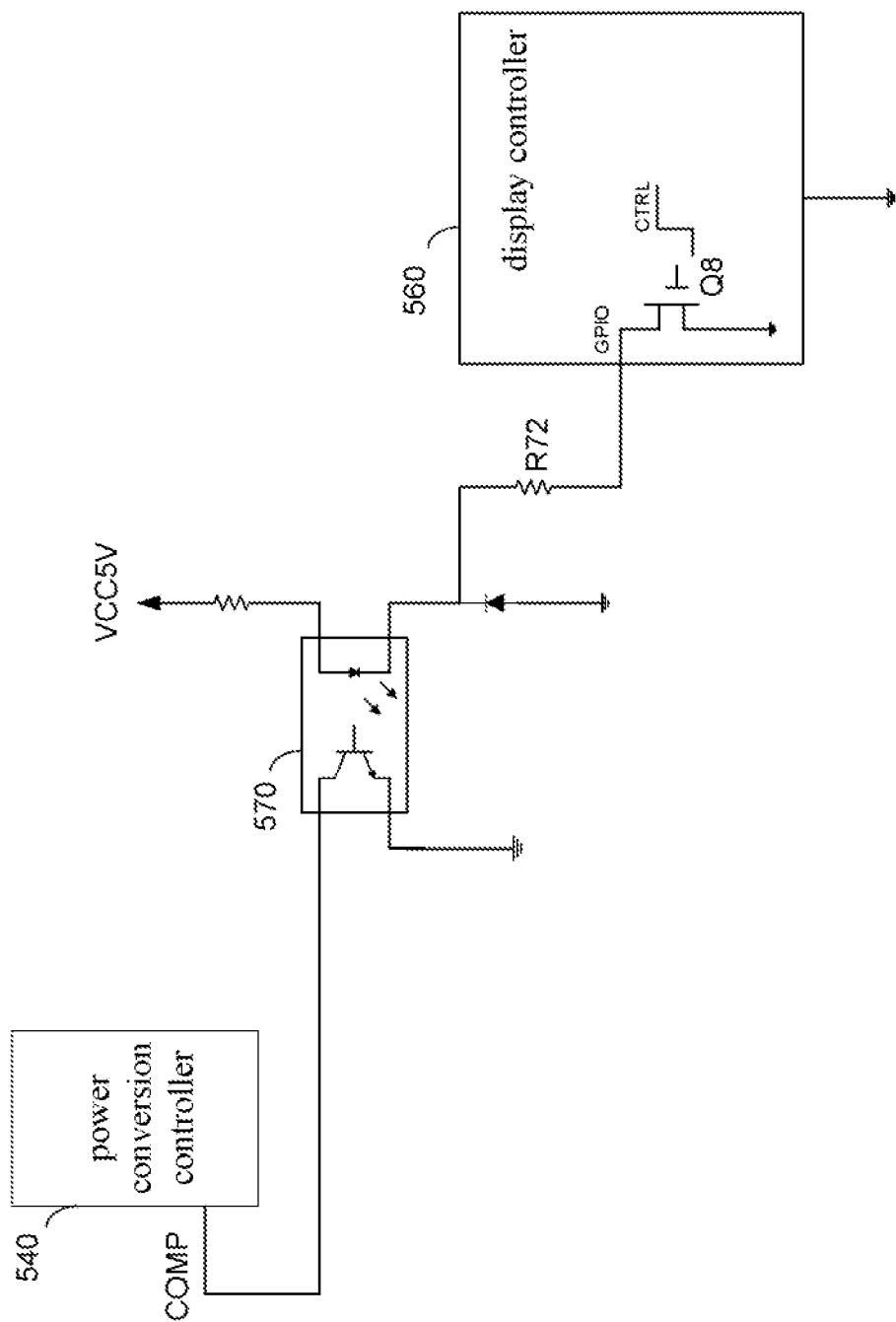
FIG. 6 is a schematic diagram of an ultra-low-power display control circuit according to yet another embodiment of the invention.

In view of the disclosure of the foregoing embodiments, various modifications may be made by a person having ordinary skill in the art without departing from the scope of the invention. For example, in the embodiments, the display controller 560 utilizes the GPIO pin to control the signal AC_OFF, and feedback controls the compensation pin COMP via the resistor R4 and the opto-coupler 570 to control whether the power conversion controller 540 draws an external power supply. Possible modifications may be made. For example, in conjunction with an auxiliary circuit, the GPIO pin may indirectly control operations of the opto-coupler 570 in drawing a current. Alternatively, by modifying circuits around the opto-coupler 570, the GPIO pin that previously outputs the level of the control signal AC_OFF may be modified for inputting purposes. Referring to FIG. 6, the opto-coupler 570 is coupled to the GPIO pin of the display controller 560 via a resistor R72, and is controlled to discharge based on whether a transistor Q8 is turned on. When the control signal CTRL is asserted, the transistor Q8 is turned on to prompt the signal COMP to activate the power conversion controller 540. Further, the diodes D4 and D5 couple to the capacitors C3 and C2 respectively to convert the low AC voltage into predetermined DC voltages VCC14V or VCC5V.

Figure 7:
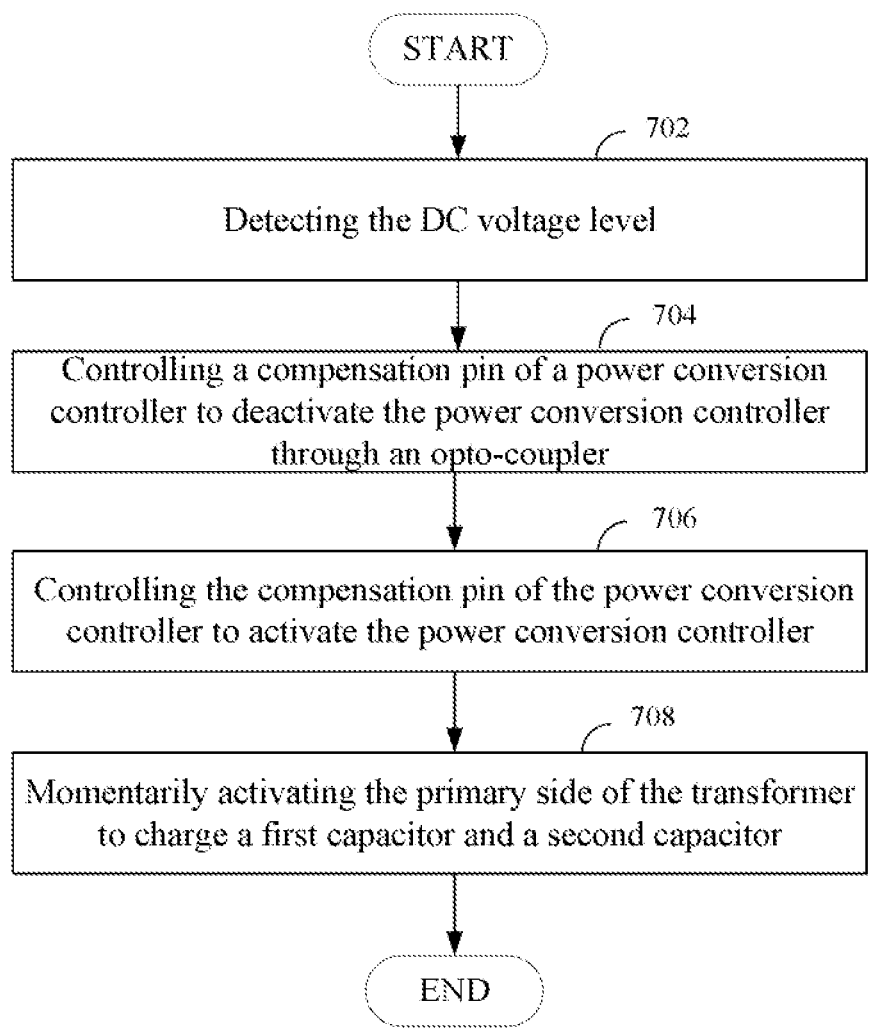
FIG. 7 is a flowchart of an ultra-low-power display control method according to one embodiment of the invention.

FIG. 7 shows a flowchart of an ultra-low-power display control method according to one embodiment of the invention. In Step 702, the DC voltage level at the secondary side of a transformer is detected. For example, changes in the signal VCC5V in FIG. 2 are detected, or changes in the signal VDD3V3 are detected, to ensure that the signal VDD3V3 is higher than 3.3V. In Step 704, by conducting a current through an opto-coupler via a GPIO pin, a display controller controls a compensation pin of a power conversion controller to deactivate the power conversion controller. For example, with reference to FIG. 5, by asserting the signal AC_OFF to increase the magnitude the coupling current of the opto-coupler 570, the power conversion controller 540 is deactivated. Alternatively, with reference to FIG. 6, the opto-coupler 570 is coupled to the GPIO pin of the display controller 560, and the power conversion controller 540 is deactivated through a discharge path controlled by the transistor Q8. In Step 706, when the DC voltage level drops to a predetermined level, by reducing the coupling current of the opto-coupler via the GPIO pin, the compensation pin of the power conversion controller is controlled to activate the power conversion controller. In Step 708, the primary side of the transformer is momentarily activated to momentarily charge a first capacitor and a second capacitor. For example, with reference to FIG. 5, the transformer 530 charges the first capacitor C1 and charges the second capacitor C2 at the secondary side by controlling the gate of the transistor Q4 using PWM or PFM.

Figure 8:
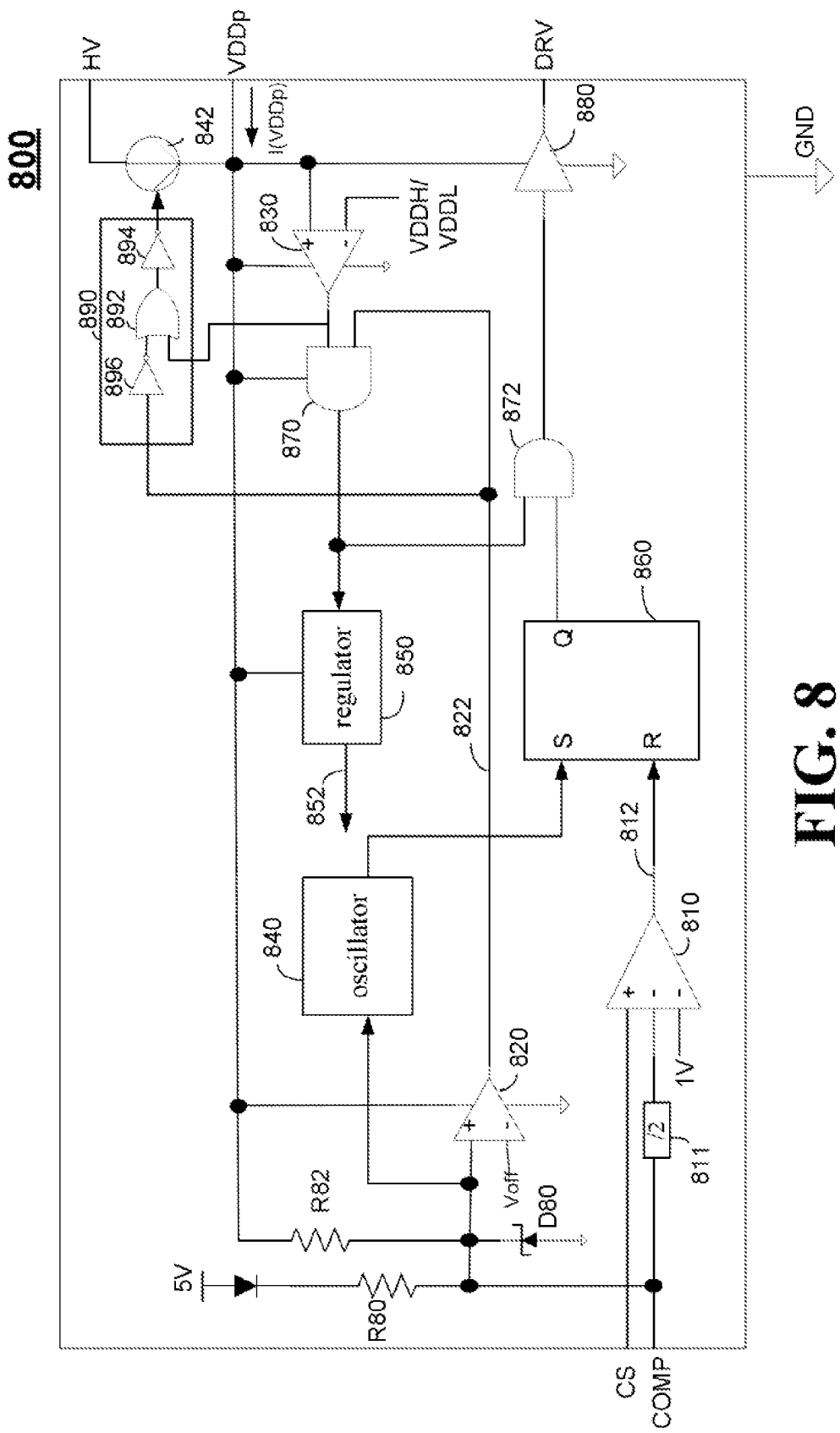
FIG. 8 is an ultra-low-power power conversion controller according to one embodiment of the invention.

FIG. 8 shows an ultra-low-power power conversion controller 800 according to yet another embodiment of the invention. The ultra-low-power power converter 800 provides HV, VDDp, DRV, CS, COMP and GND pins, external circuits of which operate as the description given in the previous embodiment. The ultra-low-power power converter 800 comprises comparators 810 and 820, a hysteresis comparator 830, an oscillator 840, a current source 842, a voltage regulator 850, a flip-flop 860, AND gates 870 and 872, a buffer 880, a control circuit 890, resistors R80 and R82, and a Zener diode D80.

Figure 9:
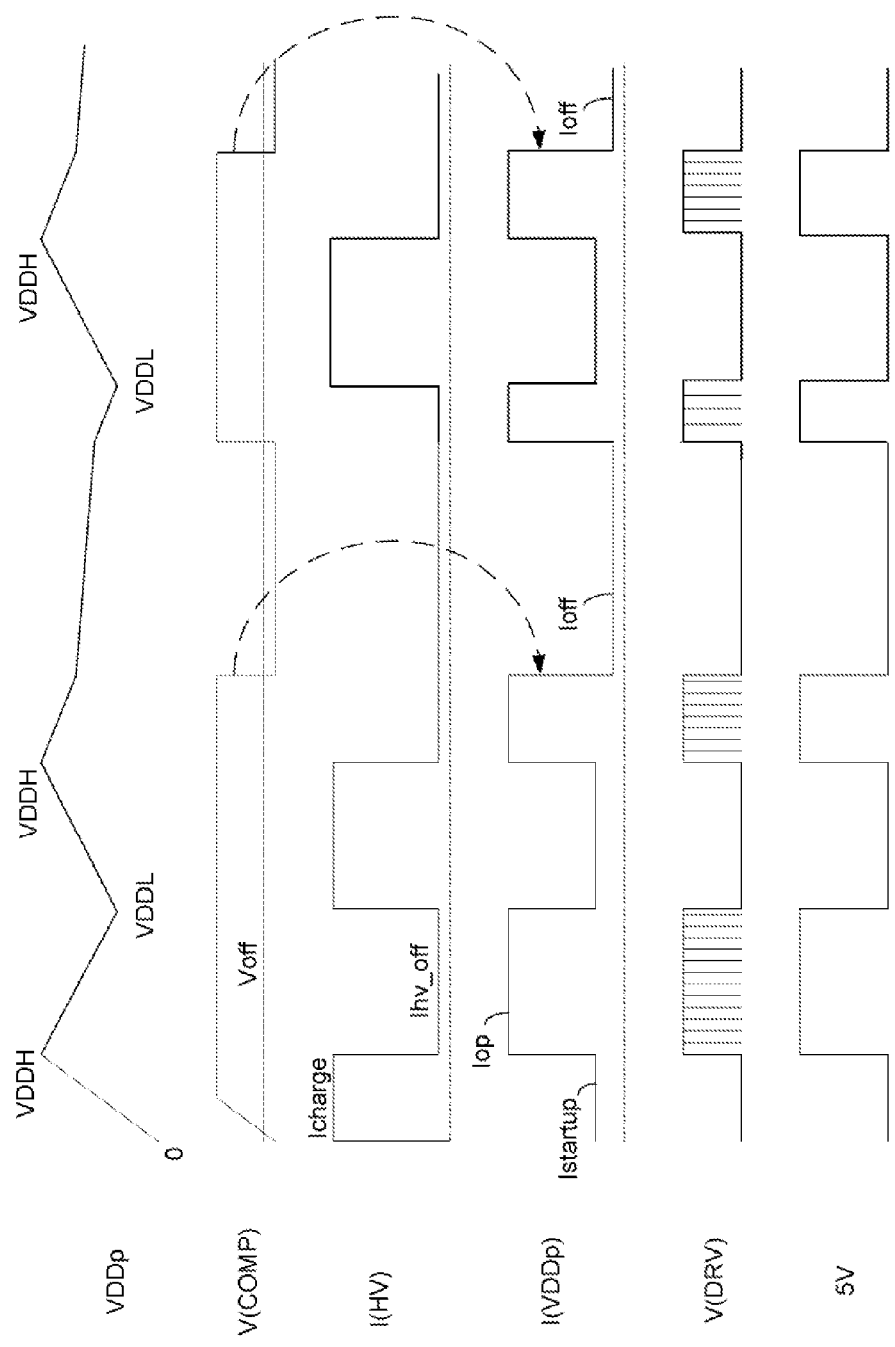
FIG. 9 is a waveform diagram of main signals in the operation of the ultra-low-power power conversion controller shown in FIG. 8.

FIG. 9 shows a waveform diagram of main signals in the operation of the ultra-low-power power conversion controller 800. In the diagram, signals V(VDDp), V(COMP), I(HV), I(VDDp), V(DRV) and 5V signals represent a voltage signal at the VDDp pin, a voltage signal at the COMP pin, current magnitude at the HV pin, current magnitude at the VDDp pin, a voltage signal at the DRV pin and a 5V voltage signal, respectively. Upon start-up of the power conversion controller 800, the HV pin charges via the current source through a capacitor (not shown) externally connected to the VDDp pin. When an input voltage at the positive end of the hysteresis comparator 830, as the potential gradually rises, reaches higher than a first hysteresis reference voltage VDDH, an output of the hysteresis comparator 830 is high, such that an output of the AND gate 870 is at high level to enable the voltage regulator 850 to output an operating voltage signal 852 for powering internal operations of the power conversion controller 800. Further, the high-level output from the hysteresis comparator 830, via an OR gate 892 and an inverter 894, turns off the current source 842 to stop the HV pin from drawing the external current. The oscillator 840 generates and outputs a square wave signal to the S input end of the SR flip-flop 860. Initially, the S input end and the Q output end of the SR flip-flop 860 are low level and high level, respectively. When the DRV pin is pulled up, via the comparator 810, the R input end of the SR flip-flop 860 is changed to high level. With the DRV pin being at high level, an external transistor (not shown) connected to the DRV pin is conducted. Meanwhile, the current sensing pin CS is pulled to high level, which then changes the R input end of the SR flip-flop 860 to high level via the comparator 810. At the moment of a next time when the SR flip-flop 860 is triggered, the S input end and R output end of the SR flip-flop 860 are at low level and high level, respectively, and the Q output end is changed to high level after the SR flip-flop 860 is triggered. More specifically, the levels at inputs at the S input end and the R input end are complementary to each other at the moment of being triggered to generate a PWM signal at the DRV pin. For example, suppose the square wave signal is 1 MHz, for reducing power consumption of the ultra-low-power power conversion controller 800 operating under a sleep mode, is outputted at the DRV pin via the AND gate 872 and the buffer 880. An external capacitor (not shown) connected to the VDDp pin then gradually releases the electric charge stored therein till the input voltage at the positive end of the hysteresis comparator 830 reaches a second hysteresis reference voltage VDDL. At this point, the output level of the hysteresis comparator 830 changes from high to low, so that the output of the AND gate 870 is changed to low, the output of the AND gate 872 is changed to low and the output of the DRV pin becomes low, to turn off the external transistor (not shown) connected to the DRV pin as well as the primary side of an external transformer (not shown). With reference to FIG. 9, the I(HV) signal that initially draws current from a charging current Icharge, has the power consumption of thereof abruptly drop to Ihv_off when the voltage signal V(VDDp) changes from the voltage VDDH to the voltage VDDL. Correspondingly, the current I(VDDp) provides a current Istartup and a current Iop, respectively. The current Iop powers the power conversion controller 80 to drive the square wave signal at the DRV pin.

When the primary side of the external transformer is conducted, a display controller (not shown) at the secondary side of the transformer is then powered to control the V(COMP) signal. As described in the foregoing embodiment, by controlling the compensation signal at the COMP pin, the time interval between two successive clusters of the PWM signals generated is increased while the time period that each cluster of the PWM signals is being generated is shortened. The power conversion controller 800 still operates in the sleep mode safely instead of being uncontrollable, e.g., not being able to be woken up.

When the voltage of the V(COMP) signal is pulled low, the oscillator 840 is forcibly turned off. Alternatively, in response to the potential of the V(COMP) signal, the output frequency of the oscillator 840 is changed properly. For example, the output frequency of the oscillator 840 is high when the potential of the V(COMP) signal is high, and is low when the potential of the V(COMP) signal is low, or vice versa. Thus, the potential of the V(COMP) signal controls the power consumption of the power conversion controller 800. Therefore, when the voltage of the V(COMP) signal is pulled low, the control comparator 820 compares the voltage at its positive end with a feedback reference voltage Voff and outputs the low level on a feedback control signal 822, so that the output of the AND gate 870 is low to disable the voltage regulator 850. Accordingly, internal power supply of the power conversion controller 800 is cut off to prompt the power conversion controller 800 to enter an ultra-low power consumption mode, with the current I(VDDp) briskly dropping to Ioff. Preferably, the current Ioff is less than 0.1*Iop, or even smaller. The potential of V(VDDP) drops very slow, i.e., a gradient of the decreasing potential of V(VDDP) becomes smaller to prolong the time for the next charging of the external capacitor, thus reducing power consumption of the whole system. By pulling down the V(COMP) signal to output low on the feedback control signal 822, the current source 842 is forcibly turned off via the inverter 896 and the OR gate 892 to stop the HV pin from drawing the external current. Since the output of the hysteresis comparator 830 is high, the current source 842 is turned off. That is, by controlling the control circuit 890 comprising the OR gate 892 and the inverters 894 and 896, timings for turning on and off the current source 842 can be controlled as desired.

Again with reference to FIG. 8, when the V(COMP) signal stops pulling low and the voltage on the COMP pin is higher than the feedback reference voltage Voff, the feedback control signal 822 becomes high, the current I(VDDp) returns to Iop, and the external large capacitor is restored to power the power conversion controller 800, whose voltage V(VDDP) is back to VDDL as in normal operations. At this point, the input voltage at the positive end of the hysteresis comparator 830 reaches the second hysteresis reference voltage VDDL, so that the output level of the hysteresis comparator 830 changes from high to low, the output of the AND gate 870 changes to low, the output of he AND gate 72 changes to low, and the output at the DRV pin changes to low.

Utilizing the current source 842, the HV pin momentarily charges the external capacitor (not shown) connected to the VDDp pin, the VDDP potential is charged from VDDL and VDDH, and the current I(VDDp) starts discharging, thus keeping charging and discharging cyclically. For example, the COMP pin may be connected to a gain amplifier 811 that provides a gain of ½. After gain adjustment by the gain amplifier 811, the voltage of the COMP pin is compared by the comparator 810 to control the R input end of the SR flip-flop 860. In this embodiment, the comparator 810 compares the voltages from the CS pin with the range between the voltage on the COMP pin of the 1V voltage.

Figure 10:
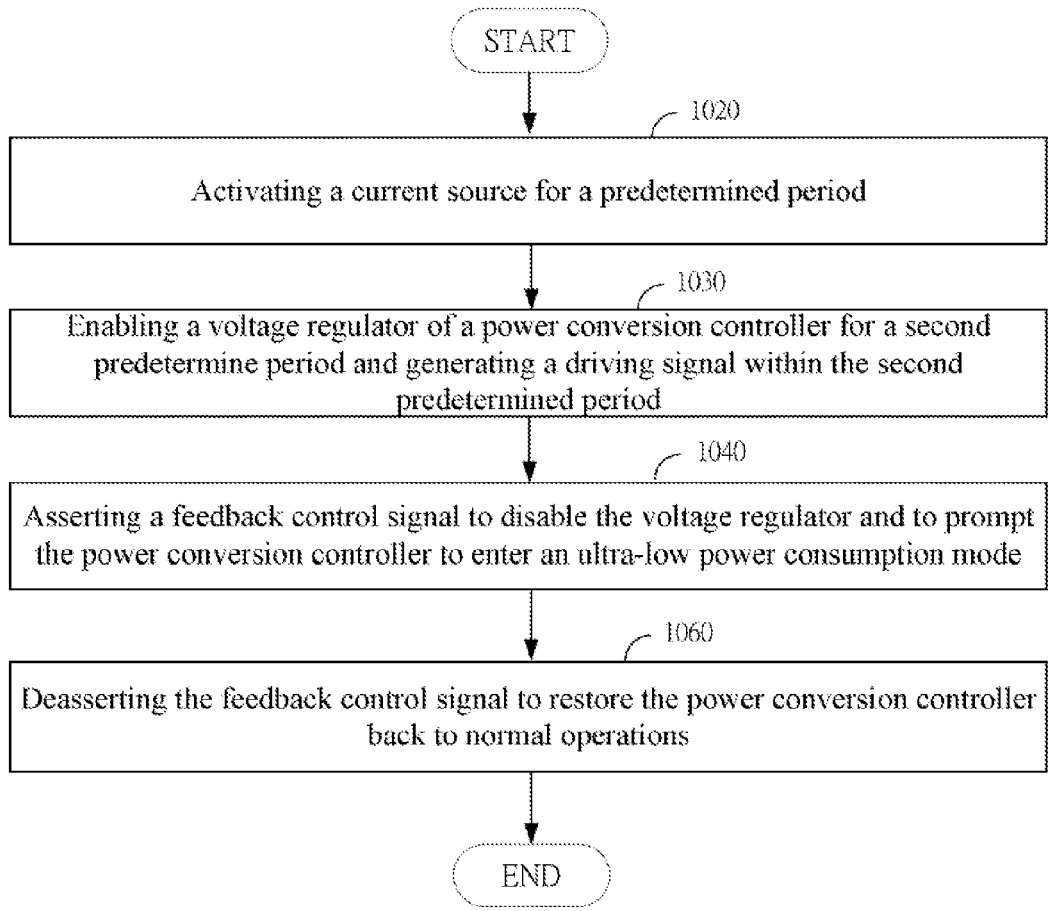
FIG. 10 is a flowchart of an ultra-low-power power conversion method according to one embodiment of the invention.

FIG. 10 shows a flowchart of an ultra-low-power power converting method according to yet another embodiment of the invention. In Step 1020, a current source is conducted for a predetermined period, e.g., charging till reaching a VDDH voltage. In Step 1030, a voltage regulator of a power conversion controller is enabled for a second predetermine period, and a driving signal, e.g., a PWM signal or a PFM signal, is generated within the second predetermined period. In Step 1040, a feedback control signal, e.g., the feedback control signal 822 in FIG. 8, is asserted to disable the voltage regulator and to prompt the power conversion controller to enter an ultra-low power consumption mode. Preferably, a current under the ultra-low power consumption mode is less than ⅒ of that under normal operations, or even lower. Preferably, the asserted feedback control signal may forcibly turn off the current source. In Step 1060, the feedback control signal is deasserted to restore the power conversion controller back to normal operations so that an external capacitor, which is previously discharged to a VDDL voltage, is recharged from the VDDL voltage to the VDDH voltage.

Again referring to operations of the ultra-low-power display control circuit 400 in FIG. 4, when the voltage signal VCC5V drops close to 3.3V, the scaler 360 deasserts the signal AC_OFF to allow the scaler 360 momentarily draw the external current. Upon detecting a wake-up event, the scaler 360 restores to a normal operating mode from an ultra-low-power mode. At this point, power consumption is instantly increased as a result of the scaler 360 prompting an oscillator and activating a microcontroller therein, leading to a brief power surge. Supposing the voltage signal VCC5V currently drops to 3.3V, erroneous operations of the overall circuit are much like incurred.

Figure 11:
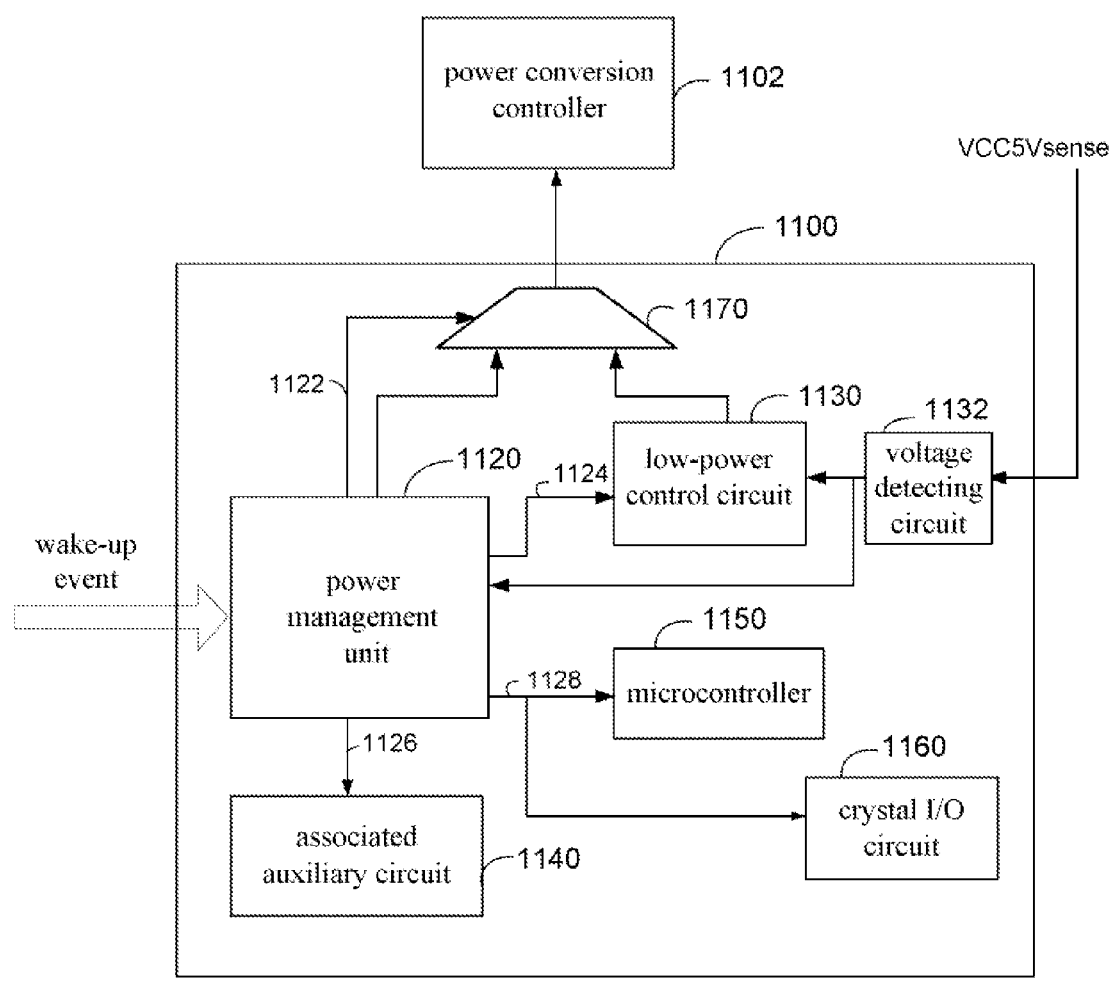
FIG. 11 is a display controller according to one embodiment of the invention.

FIG. 11 shows a display controller according to one embodiment of the invention. A display controller 1100 comprises a power management unit 1120, a low-power control circuit 1130, a microcontroller 1150, a crystal I/O circuit 1160, a multiplexer 1170, and an associated auxiliary circuit 1140 in the display controller 1100. The low-power control circuit 1130 detects the sensing signal VCC5Vsense through a voltage detecting circuit 1132 to operate in a low-power power saving mode as described in previous embodiments. For example, via the signal AC_OFF generated by the GPIO pin, the power conversion controller 1102 is prompted into a low-power power saving mode. For example, the voltage detecting circuit 1132 is a SAR ADC or a comparator. In this embodiment, when the power management unit 1120 detects a wake-up event, the multiplexer 1170 is controlled by a signal 1122 to select an output signal between two input ends connected to the power management unit 1120. At this point, the power management unit 1120 deasserts the signal AC_OFF to first restore the power conversion controller 1102 to a normal operating mode. Next, the power management unit 1120 deactivates the low-power control circuit 1130 with a signal 1124, and turns off the associated auxiliary circuit 1140 with a signal 1126. The associated auxiliary circuit 1140, e.g., a Digital Visual Interface (DVI) clock amplifier or a High-Definition Multimedia Interface (HDMI) clock amplifier, may be turned off. Since the power conversion controller 1102 is presently under a normal operating mode, the sensing signal VCC5Vsense in oscillation gradually rises, and when the display controller 1100 detects that the sensing signal VCC5Vsense reaches a predetermined level or having charged for a predetermined period, the power conversion controller 1102 wakes up the microcontroller 1150 and the crystal I/O circuit 1160 with a signal 1128 and the associated auxiliary circuit 1140 with the signal 1126. The crystal I/O circuit 1160 may be coupled to an external crystal oscillator, which is activated provided that the crystal I/O circuit 1160 is activated, so as to restore the display controller 1100 to a normal operating mode. With description according to this embodiment, the display controller 1100 is applicable to the scaler 360 in FIG. 4.

Figure 12:
FIG. 12 is a waveform diagram of a sensing signal according to one embodiment of the invention.

FIG. 12 shows a waveform diagram of a sensing signal VCC5V sense according to one embodiment of the invention. When the display controller 1100 in FIG. 11 detects that the sensing signal VCC5Vsense reaches a predetermined level $V_{PD}$, the power conversion controller 1102 wakes up the microcontroller 11 and the crystal I/O circuit 1160, the multiplexer 1170, and the associated auxiliary circuit 1140 with signals 1128, 1124 and 1126, respectively, to restore the display controller 110 back to a normal operating mode.

Figure 13:
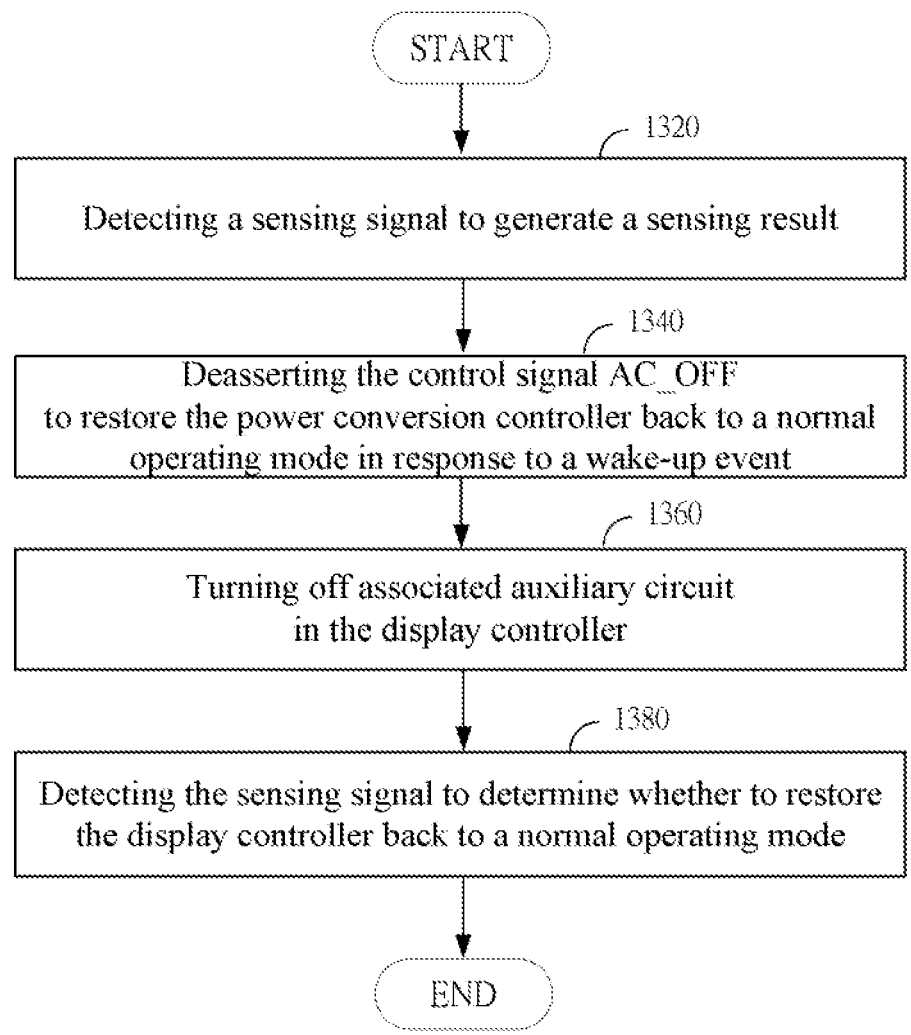
FIG. 13 is a flowchart of a low-power display control method according to one embodiment of the invention.

FIG. 13 shows a flowchart of a low-power display control method applied to a display controller according to one embodiment of the invention. In Step 1320, a sensing signal VCC5Vsense is detected to generate a sensing result, according to which a control signal AC_OFF is generated to control a power conversion controller to operate in a low-power power saving mode. For example, by generating the control signal AC_OFF with a GPIO pin, the power conversion controller is prompted to operate in a low-power power saving mode. For example, the sensing result is generated by analog-to-digital converting the sensing signal. Alternatively, the sensing result is generated by comparing the sensing signal VCC5Vsense with a predetermined voltage level. In Step 1340, in the occurrence of a wake-up event, the control signal AC_OFF is deasserted to restore the power conversion controller back to a normal operating mode. In Step 1360, an associated auxiliary circuit in the display controller is turned off. In Step 1380, the sensing signal VCC5Vsense is detected to determine whether a predetermine level is reached, or after charging for a predetermined period, a microcontroller, a crystal I/O circuit and an associated auxiliary circuit are woken up to restore the display controller back to a normal operating mode.

To sum up, the invention provides a display controller comprising a voltage detecting circuit, a low-power control circuit, a power management unit, a selector, a microcontroller and a crystal I/O circuit. The voltage detecting circuit detects a voltage level of a sensing signal. The low-power control circuit, coupled to the voltage detecting circuit, generates a first control signal according to the voltage level. The voltage detecting circuit can be exemplified by an analog-to-digital converter (ADC) or a comparator. The power management unit receives a wake-up event and generates a second control signal in response to the wake-up event. The selector, coupled to the low-power control circuit and the power management unit, selectively outputs either the first control signal or the second control signal to control a power conversion controller to operate in a low-power power saving mode or a normal operating mode, and can be exemplified by a multiplexer. When the selector outputs the second control signal, the power management unit deactivates the low-power control circuit, the microcontroller, the crystal I/O circuit and a DVI/HDMI clock amplifier to reduce power consumption.

The invention further provides a low-power display control method applied to a display controller. The lower-power display control method comprises: detecting a sensing signal to generate a sensing result, e.g., converting the sensing signal with an ADC to generate a sensing result, or comparing the sensing signal with a predetermined voltage level to generate a sensing result; generating a control signal according to the sensing result, e.g., generating the control signal with a general purpose input/output (GPIO) pin to control a power conversion controller to operate in a low-power power saving mode; deasserting the control signal and deactivating an associated auxiliary circuit in the display controller in response to a wake-up event, e.g., deactivating a microcontroller, a crystal I/O circuit and a DVI/HDMI clock amplifier; and waking up and restoring the display controller to a normal operating mode.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A display controller, comprising:
    a voltage detecting circuit, configured for detecting a voltage level of a sensing signal associated with a voltage signal of a secondary side of a transformer, thereby powering the display controller in accordance with the sensing signal;
    a low-power control circuit, coupled to the voltage detecting circuit, configured for generating a first control signal according to the voltage level of the sensing signal;
    a power management unit, configured for receiving a wake-up event and generating a second control signal in response to the wake-up event;
    a microcontroller;

a crystal input/output (I/O) circuit; and
a selector, coupled to the low-power control circuit and the power management unit, configured for selectively outputting either the first control signal or the second control signal;
wherein, when the selector outputs the second control signal, the power management unit deactivates the low-power control circuit, the microcontroller, and the crystal I/O circuit, and then reactivates the microcontroller and the crystal I/O circuit when either the voltage level of the sensing signal reaches a predetermined level or said display controller has charged for a predetermined period of time.

2. The display controller as claimed in claim 1, further comprising a Digital Visual Interface (DVI) amplifier.

3. The display controller as claimed in claim 2, wherein the power management unit deactivates the DVI clock amplifier when the selector outputs the second control signal.

4. The display controller as claimed in claim 1, further comprising a High-Definition Multimedia Interface (HDMI) amplifier.

5. The display controller as claimed in claim 4, wherein the power management unit deactivates the HDMI clock amplifier when the selector outputs the second control signal.

6. The display controller as claimed in claim 1, wherein the selector is a multiplexer.

7. The display controller as claimed in claim 1, wherein the selector selectively outputs either the first control signal or the second control signal to control a power conversion controller to operate in a low-power power saving mode or a normal operating mode.

8. The display controller as claimed in claim 7, wherein the voltage detecting circuit is an analog-to-digital converter (ADC) or a comparator.

9. The display controller as claimed in claim 1, wherein a power conversion controller controls the display controller to operate either in a low-power power saving mode or a normal operating mode according to the voltage signal outputted from the secondary side of the transformer by comparing the sensing signal with a reference voltage.

10. The display controller as claimed in claim 9, wherein the first control signal and the second control signal are transmitted to the power conversion controller via the selector, providing looping feedback control of the voltage signal of the secondary side of the transformer and associated voltage level of the sensing signal.

11. A low-power display control method, applied to a display controller, comprising:
converting AC voltage received at a primary side of a transformer to a lower AC voltage at the secondary side of a transformer;
detecting a sensing signal associated with a voltage signal of the secondary side of the transformer to generate a sensing result, thereby powering the display controller in accordance with the sensing signal;
generating a control signal according to the sensing result to control a power conversion controller to control the display controller to operate in a low-power power saving mode by activating a low-power control circuit;
deasserting the control signal and deactivating an associated auxiliary circuit in the display controller in response to a wake-up event, which deactivates the low-power control circuit, a microcontroller, and a crystal I/O circuit in the display controller; and
waking-up the display controller to restore to a normal operating mode which reactivates the microcontroller and the crystal I/O circuit when either the voltage level of the sensing signal reaches a predetermined level or said display controller has charged for a predetermined period of time.

12. The method as claimed in claim 11, wherein the generating step generates the control signal by a general purpose input/output (GPIO) pin.

13. The method as claimed in claim 11, wherein the detecting step analog-to-digital converts the sensing signal to generate the sensing result.

14. The method as claimed in claim 11, wherein the waking-up step wakes up the display controller to restore to the normal operating mode when the sensing signal reaches a predetermined voltage level.

15. The method as claimed in claim 11, wherein the deasserting step deactivates a DVI clock amplifier in the display controller.

16. The method as claimed in claim 11, wherein the deasserting step deactivates an HMDI clock amplifier in the display controller.

17. The method as claimed in claim 11, wherein detecting the sensing signal associated with the voltage signal of the secondary side of the transformer to generate a sensing result is made by comparing the sensing signal with a reference voltage.

18. The method as claimed in claim 17, wherein the power conversion controller provides looping feedback control of the voltage signal of the secondary side of the transformer and associated voltage level of the sensing signal.

* * * * *